United States Patent [19]
Butzow et al.

[11] 3,863,781
[45] Feb. 4, 1975

[54] ARTICLE UNLOADER

[75] Inventors: Neil W. Butzow, Greendale; Glenn J. Eggert, Cedarburg; Bert Krivec, Waukesha; Gary J. Rollinger, Belgium, all of Wis.

[73] Assignee: Rexnord, Inc., Milwaukee, Wis.

[22] Filed: Apr. 6, 1973

[21] Appl. No.: 348,785

[52] U.S. Cl. ............ 214/62 R, 105/268, 214/62 A, 214/307
[51] Int. Cl. .................................. B65g 67/24
[58] Field of Search ............ 214/62 A, 53, 307, 60, 214/306, 62 R; 198/155, 143; 105/241 C, 268; 244/114 R, 137 R

[56] References Cited
UNITED STATES PATENTS

| | | | |
|---|---|---|---|
| 561,485 | 6/1896 | Carroll | 214/53 |
| 772,569 | 10/1904 | Kling | 214/62 A |
| 977,699 | 12/1910 | Berryman | 214/62 A |
| 1,135,669 | 4/1915 | Culemeyer | 214/62 A |
| 3,381,832 | 5/1968 | Vilagos et al. | 214/62 R |
| 3,602,383 | 8/1971 | Howat | 214/307 |
| 3,651,967 | 3/1972 | Rooke et al. | 214/307 |

Primary Examiner—Robert J. Spar
Assistant Examiner—Gary Auton
Attorney, Agent, or Firm—Sughrue, Rothwell, Mion, Zinn & Macpeak

[57] ABSTRACT

Apparatus for unloading articles, such as luggage, from containers while the containers are being conveyed through an unloading station. The containers have one or more shelves on which the articles may be placed and also have a side which may be folded back over the top of the container and out of the way. These containers are carried on dollies which have upper surfaces which may be tilted transversely to their direction of motion as they pass through the unloading station, thereby tilting the containers and tending to cause the articles to slide from their shelves. The unloading station includes one or more pivotable retaining doors and means for causing the dollies to pass through the unloading station in close lateral register with the retaining doors, so that the retaining doors keep the articles from sliding from the containers before it is desired that they should. The unloading station also includes one or more downwardly sloping chutes positioned immediately downstream of the retaining doors so that the articles in the containers will slide into the chutes as the containers pass beyond the retaining doors.

9 Claims, 8 Drawing Figures

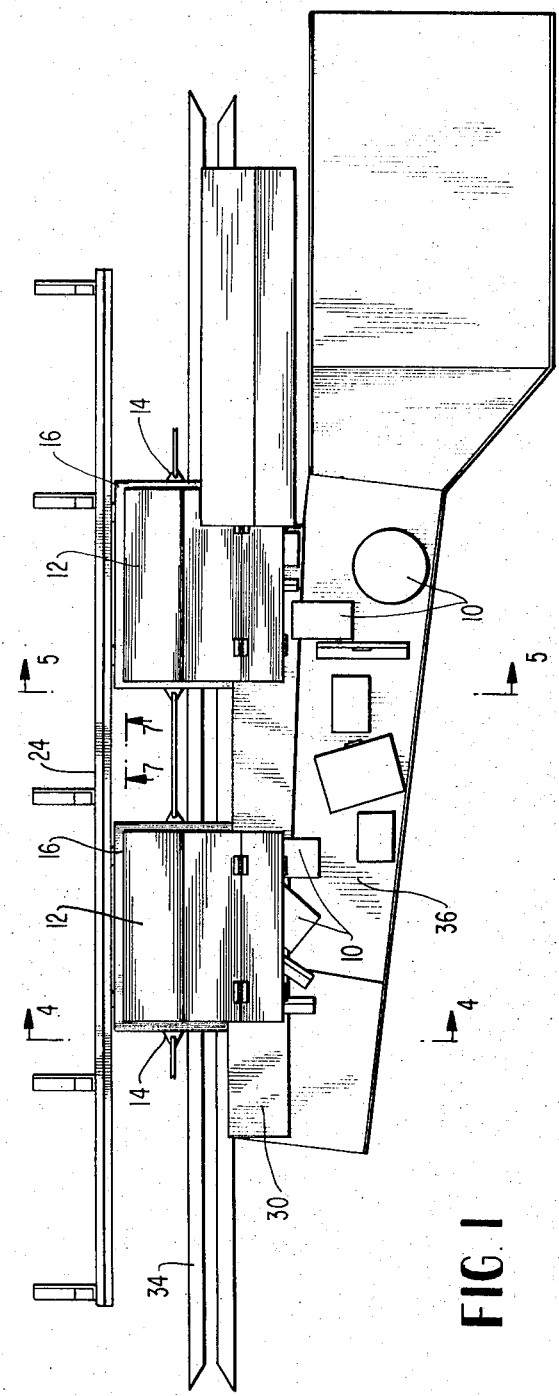
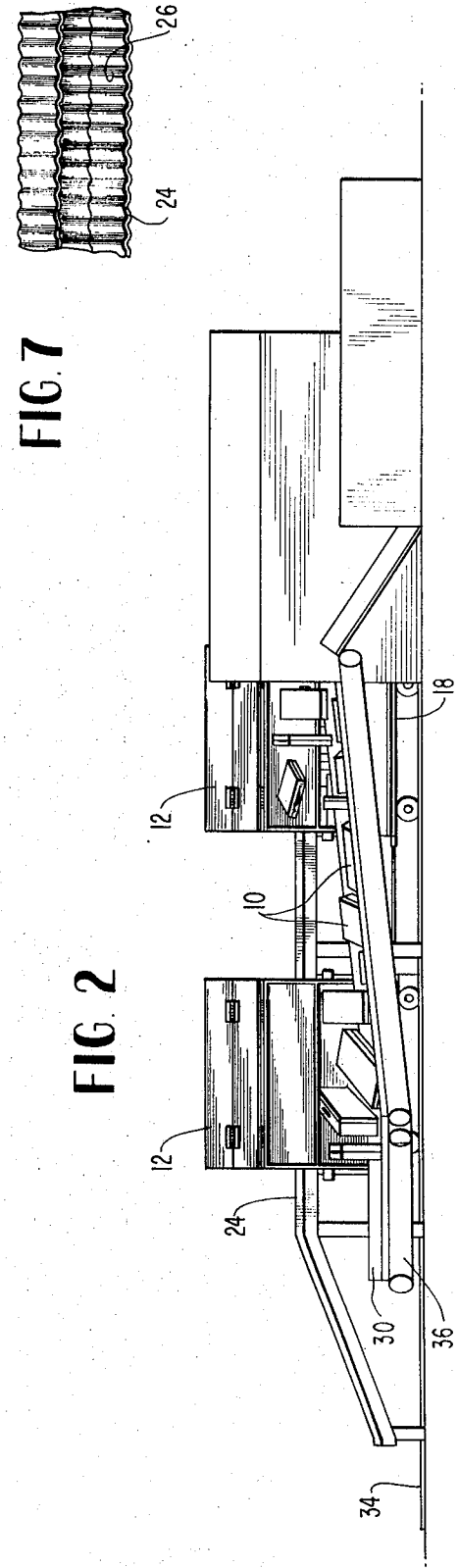
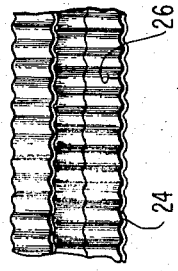
FIG. 7
FIG. 2
FIG. 1

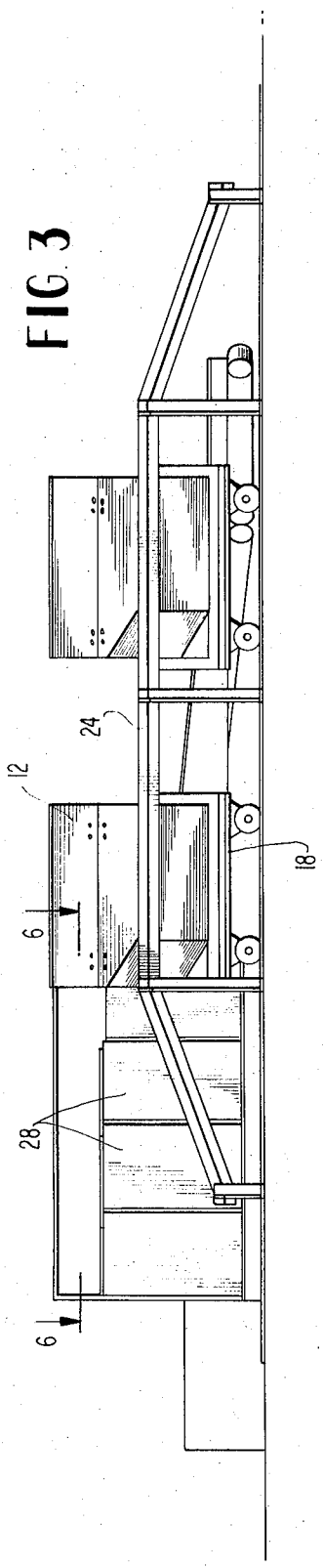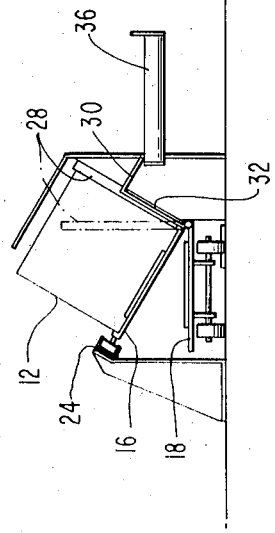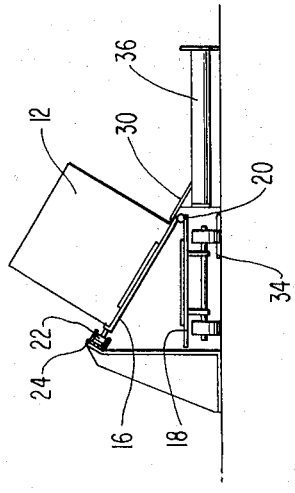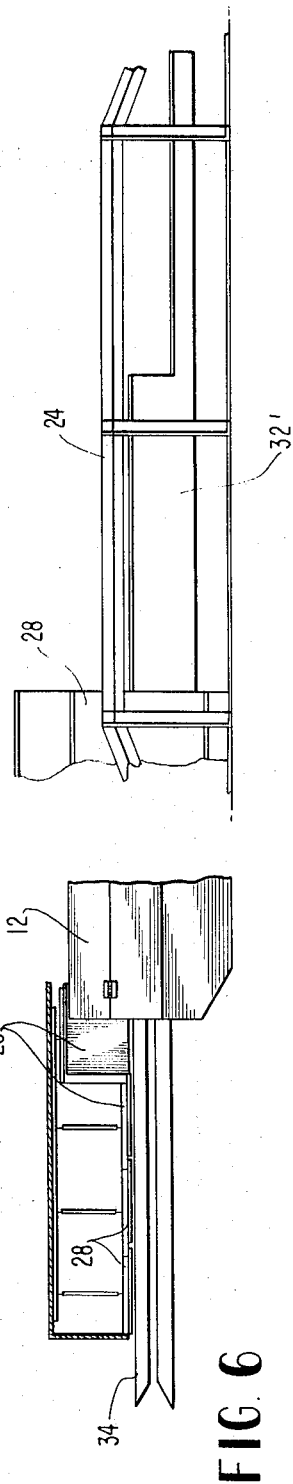

ARTICLE UNLOADER

BACKGROUND OF THE INVENTION

1. Field of the Invention

This invention relates generally to apparatus for unloading articles from containers while the containers are being conveyed through an unloading station, and it is particularly well adapted to unloading luggage from airplane flight containers.

2. Description of the Prior Art

The prior art in the field to which this invention is most particularly well adapted, that of unloading luggage from airplane flight containers, is believed to be practically non-existent. Luggage is commonly manually loaded onto the sleeves of light-weight airplane flight containers, the flight containers are loaded aboard airplanes, and, at their destinations, the flight containers are unloaded from the airplanes on to dollies (pulled, typically, by small tractors) and conveyed to an unloading station, where they are manually unloaded from the flight containers and loaded on to appropriate sorting apparatus.

Obviously, this procedure is very labor-intensive and therefore undesirable in a society faced with a rapidly increasing volume of air travel and steadily rising labor costs. Accordingly, the present invention is designed to substantially mechanize the unloading of articles, such as luggage, from containers, such as airplane flight containers.

A further advantage of the preferred embodiment of the present invention is that its operation is purely mechanical. No electrical, hydraulic, or pneumatic systems are required, thus minimizing maintenance costs, and all required power is supplied by the tractor which pulls the dollies through the unloading station.

A further advantage of the preferred embodiment of the present invention is that it unloads containers having a plurality of shelves in a programable manner. Each shelf is unloaded at a different point in the process of the container through the unloading station, first the top shelf, then the next, and so on.

A further advantage of the preferred embodiment of the present invention is the relatively small space which it requires. Conventional, full-size airplane flight containers can be unloaded in a space 14 feet wide, 10 feet high, and 78 feet long.

A further advantage of the present invention is that is enables the mechanical unloading of articles from containers in a continuous fashion.

SUMMARY OF THE INVENTION

The present invention relates to apparatus for unloading articles, such as luggage, from containers while the containers are being conveyed through an unloading station. The basic principle of the invention comprises first rotating each loaded container about an open side thereof while holding its contents in with a first pivotable, but non-translating, retaining surface, then progressively unloading it by the lowering of a second non-translating and non-pivoting retaining surface toward the base of the container. In practice, the containers are carried on a first conveyor, such as a dolly, at least the upper surface of which can be tilted transversely to its direction of motion as the containers pass through the unloading station, thereby tilting the containers and tending to cause the articles to slide from within the containers. The unloading station includes one or more retaining surfaces, such as pivotally mounted doors, adapted to bear against the articles contained in the containers while they are being tilted, and it may include a register adapted to ensure that the conveyor passes through the unloading station in close register with the retaining surface or surfaces. The unloading station also includes one or more second conveyors, such as downwardly sloping chutes, which are located in the unloading station immediately downstream of the retaining surface or surfaces and which are adapted to receive and carry articles slid off the containers by the tilting of the first conveyor.

BRIEF DESCRIPTION OF THE DRAWINGS

FIG. 1 is a plan view of an unloading station employing the present invention.

FIG. 2 is a side view of the unloading station shown in FIG. 1.

FIG. 3 is a side view of the unloading station shown in FIG. 1, taken from the opposite side from FIG. 2.

FIG. 4 is a view taken along the lines 4—4 in FIG. 1.

FIG. 5 is a view taken along the lines 5—5 in FIG. 1.

FIG. 6 is a view taken along the lines 6—6 in FIG. 3.

FIG. 7 is a view taken along the lines 7—7 in FIG. 1.

FIG. 8 is a partial side view showing an alternative embodiment of a part of the present invention.

DETAILED DESCRIPTION OF THE PREFERRED EMBODIMENT

FIGS. 1-7 show an embodiment of the present invention adapted for use in unloading luggage 10 from conventional airplane flight containers 12. The flight containers 12 are lightweight structures, in form something like a bookcase, but with covers on one or both sides which may be folded up to permit loading and unloading and down to protect the contents from inclement weather encountered on the trip between the airplane and the unloading station. The flight containers 12 are adapted to be loaded on airplanes and quickly unloaded on to dollies 14 which may be pulled to and through the unloading station by a tractor (not shown).

The dollies 14 may be basically conventional airport dollies. However, each dolly is outfitted with an upper surface 16 which is pivotably mounted with respect to the body 18 of the dolly 14 by a hinge 20 and has a cam roller 22 mounted on the side opposite from the hinge 20. The upper surface 16 is designed to fit between the conventional dolly rollers in order to maintain normal container/dolly on/off and rotational motion capability, and the cam roller 22 may be designed to fold under the body 18 of the dolly 14 and out of the way as a safety precaution and to prevent damage during normal ramp transit. The subassembly comprising the upper surface 16 and the hinge 20 can be provided separately, so that conventional dollies can be readily modified for use with the other elements of the present invention.

The cam roller 22 is positioned to cooperate with a cam surface 24, thereby causing the upper surface 16 of the dolly 14 to pivot around the hinge 20. For the purpose of unloading airplane luggage, a maximum angle of 30° has been found adequate. However, a corrugated surface 26 is preferably provided on the cam surface 24 to vibrate loose any "reluctant" luggage contained in the flight containers 12.

On the opposite side of the dolly from the cam surface 24, and starting at least one container length before the cam surface 24 begins to cause the upper surfaces 16 of the dollies 14 to tilt, are a plurality of retaining doors 28. These doors 28 are pivotably mounted about an axis parallel to the direction of motion of the dollies 14 and located at a height approximately equal to that of the hinge 20. Thus, when the containers 12 are tilted against the retaining doors 28, the latter rotate with the former. However, the retaining doors 28 are counter-balanced or spring loaded so that they tend to remain in the vertical position and to return there when forced away from it by the rotation of a container 12. Luggage 10 contained within the containers 12 tends to slide against the retaining door 28, but, if the dolly 14 is maintained in close registry with the retaining doors 28, the luggage 10 is effectively prevented from falling between the dollies 14 and the retaining doors 28.

The retaining doors 28 are built in overlapping relationship so that the doors downstream of any given door will always be rotated by at least as much as that door, thereby ensuring a smooth transition from one door to the next as the dollies 14 move through the unloading station. However, the overlapping construction also allows the doors upstream from a given dolly to pivot back towards the vertical, thereby preventing interference with the succeeding container. To allow this pivoting back towards the vertical, the width of the doors must be less than the distance between the dollies in the most closely spaced dolly train intended to be used with the system by a distance at least equal to the maximum velocity at which the dolly trains are expected to be driven times the time required for the doors to pivot from one position to another.

Immediately downstream of the last retaining door 28 are one or more downwardly sloping clutes 30 positioned to receive the luggage 10 when it is no longer held back on the shelves on the containers 12 by the retaining doors 28. In the embodiment shown in FIGS. 1–7, the chute 30 slopes downwardly both in the direction in which the containers are conveyed through the unloading station and in the direction perpendicular thereto in the horizontal plane. This configuration is preferred because it will accept any combination of shelf spacings, with each shelf simply unloading at the point where the chute drops to its level as it slopes downward in the direction in which the containers are conveyed. However, is has the disadvantage that the motion of the luggage as it slides down the chute is at an angle to the way the luggage is normally packed in the containers, and this has some tendency to cause the luggage to tip over. The stepped embodiment shown in FIG. 8 eliminates this disadvantage, but its usefulness is dependent on being able to control the spacing of the shelves in the containers with which the chute is used. In this configuration, the chutes 32' slope downwardly only in the direction perpendicular to the direction in which the containers are conveyed through the unloading station, and, if the velocity of the dollies is small, the motion of the luggage is essentially straight out of the containers 12.

As may be seen in FIG. 5, a retaining surface 32 must be provided beneath the upper end of the chute 30 to prevent luggage from sliding out from the container 12 and falling under the chute 30. However, since the containers 12 should be fully tilted before they reach the chute 30, the retaining surface 32 can be fixed in position at an angle to the vertical corresponding to the maximum angle to which the containers 12 are tilted.

A register 34 is preferably provided to ensure that the cam roller 22 stays in contact with the cam surface 24 on one side of the dolly and that the dollies 14 pass through the unloading station in close register with the retaining doors 28 and the chute 30 on the other. Since the cam surface 24 can easily be made of sufficient width to provide for any forseeable inaccuracy in the driving of the tractor driver, the latter registration requirement has been found to be the more important one in practice. In order to ensure that the luggage 10 carried in the flight containers 12 will not slide from the containers 12 and fall between them and the retaining doors 28 or the chutes 30, it has been found necessary to maintain a registry of one or two inches tolerance.

As may best be seen in FIG. 2, once the containers have been completely emptied, the cam surface 24 is shaped to bring the upper surfaces 16 of the dollies 14 back to the horizontal, after which the dollies pass from the unloading station. As may also best be seen in FIG. 2, at the bottom of the chute 30 a conveyor 36 of any conventional design can be located, which conveyor can be used to further transport the unloaded luggage 10 in any desired manner.

CAVEAT

While the present invention has been illustrated by a detailed description of a preferred embodiment and of part of an alternative embodiment of one portion thereof, it will be obvious to those skilled in the art that various changes and modifications could be made in those embodiments without departing from the scope and spirit of the invention. For that reason, the invention must be measured by the claims appended hereto and not solely by reference to the previously described embodiments. While the following list is by no means exhaustive, it is offered as illustrative of the kinds of changes and modifications which can be made in the previously described embodiments without departing from the true scope of the present invention.

1. The cam tilt mechanism can be located on the same side of the dolly as the hinge, rather than on the opposite side.

2. The wholly dolly can be tilted, rather than just its upper surface. However, analyses have shown that many additional problems arise if this configuration is utilized and that, in particular, it causes excessive loads to the axels and wheels of the dollies which must be overcome with additional hardware.

3. The dolly can be driven on a tilted roadway, rather than a flat surface, thereby giving the containers some or all of the required tilt.

4. "Reluctant" luggage can be vibrated loose using vibration strips on the road surface, rather than on the cam surface. However, this requires that the tractor driver be subjected to the vibration as well as the "reluctant" luggage.

5. Only one retaining door need be used, particular if trains comprising a plurality of dollies are not to be employed.

6. Instead of a plurality of overlapping retaining doors, one could use a continuous flexible sheet adapted to flex locally from the rotation of an adjacent container but still being sufficiently rigid while flexed to hold the contents in the container.

7. Instead of a movable retainer surface, one could use a curved, rigid retaining surface the inclination of which would vary in the direction of the motion of the containers through the unloading station in a manner corresponding to the progressive tilting of the containers. However, such a configuration would require such a long tilting area in order to keep the containers and the retaining surface in sufficiently close registry that it would be practical for most situations.

8. Instead of a tow tractor, the dollies could be pulled through the unloading station by a fixed-plant tow line of any appropriate design.

9. The containers could be conveyed through the unloading station on a conveyor belt, rather than on dollies. Such a conveyor could be of flexible construction, so that it could be tilted as a whole, or it could bear hinged plates on the upper surface thereof which could be tilted up from the body of the conveyor belt in the same manner as the upper surface of the previously described dollies are tilted up from their bodies.

What is claimed is:

1. Apparatus for unloading articles from a container while the container is being conveyed through an unloading station, said apparatus comprising:
   1. a first conveyor which is
      a. adapted to carry said container and
      b. adapted to tilt about a first axis parallel to the direction in which said container is to be conveyed through said unloading station while said container is being conveyed through said unloading station;
   2. a retaining surface comprising a plurality of doors pivotably mounted about a second axis parallel to the direction in which said container is to be conveyed through said unloading station, said second axis being located at a height approximately equal to that of said first axis, said plurality of doors being adapted to bear against articles contained in said containers while said first conveyor is being tilted and being built in overlapping relationship so that the doors downstream of any given door will always be rotated by at least as much as that door, thereby ensuring a smooth transition from one door to the next as said container is conveyed through the unloading station; and
   3. a second conveyor which is
      a. adapted to carry said articles and
      b. located in said unloading station immediately downstream of said retaining surface in a position to receive articles slid off said container, whereby articles may be unloaded from said container while it is being conveyed through said unloading station, said articles first being retained within said container by said retaining surface while said container is being tilted and then being deposited on said second conveyor when the tilting has been fully accomplished.

2. Apparatus as claimed in claim 1 and further comprising a register adapted to ensure that said first conveyor passes through said unloading station in close register with said retaining surface, thereby ensuring that said articles will not slide from said container prematurely and fall between said retaining surface and said first conveyor.

3. Apparatus as claimed in claim 1 and further comprising a register adapted to ensure that said first conveyor passes through said unloading station in close register with said second conveyor, thereby ensuring that said articles will not slide from said container and fall between said first and second conveyor.

4. Apparatus as claimed in claim 1 wherein said first conveyor comprises a dolly.

5. Apparatus as claimed in claim 4 wherein said dolly comprises:
   a. a body and
   b. an upper surface adapted to tilt relative to said body.

6. Apparatus as claimed in claim 5 wherein said dolly further comprises a cam roller and wherein said apparatus further comprises a cam surface adapted to cooperate with said cam roller to cause said tilt.

7. Apparatus as claimed in claim 1 wherein said second conveyor is a downwardly sloping chute.

8. Apparatus as claimed in claim 7 wherein said chute slopes downwardly both in the direction in which said containers are to be conveyed through said unloading station and in the direction perpendicular to the first-named direction in the horizontal plane.

9. Apparatus as claimed in claim 7 wherein said chute slopes downwardly only in the direction perpendicular to the direction in which said container is to be conveyed through said unloading station.

* * * * *